United States Patent
Chen et al.

(10) Patent No.: US 11,057,892 B2
(45) Date of Patent: Jul. 6, 2021

(54) BEAM CONFIGURATION METHOD AND APPARATUS

(71) Applicant: HUAWEI TECHNOLOGIES CO., LTD., Guangdong (CN)

(72) Inventors: Lei Chen, Chengdu (CN); Peng Guan, Chengdu (CN); Cheng Qin, Beijing (CN); Peng Jiang, Shenzhen (CN); Jianqin Liu, Beijing (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 16/928,818

(22) Filed: Jul. 14, 2020

(65) Prior Publication Data
US 2020/0344742 A1 Oct. 29, 2020

Related U.S. Application Data

(63) Continuation of application No. PCT/CN2019/071590, filed on Jan. 14, 2019.

(30) Foreign Application Priority Data

Jan. 19, 2018 (CN) .......................... 201810055215.1

(51) Int. Cl.
*H04W 72/04* (2009.01)
*H04B 7/06* (2006.01)
*H04B 7/08* (2006.01)

(52) U.S. Cl.
CPC ........ *H04W 72/046* (2013.01); *H04B 7/0617* (2013.01); *H04B 7/086* (2013.01); *H04W 72/042* (2013.01)

(58) Field of Classification Search
None
See application file for complete search history.

(56) References Cited

U.S. PATENT DOCUMENTS

2020/0267571 A1* 8/2020 Park .................. H04W 72/0446
2020/0288479 A1* 9/2020 Xi ............................ H04B 7/02

FOREIGN PATENT DOCUMENTS

| CN | 103875271 A | 6/2014 |
|---|---|---|
| CN | 106304349 A | 1/2017 |
| CN | 106537802 A | 3/2017 |
| CN | 106793125 A | 5/2017 |

(Continued)

OTHER PUBLICATIONS

Extended European Search Report issued in European Application No. 19741176.2 dated Dec. 10, 2020, 10 pages.

(Continued)

*Primary Examiner* — Adolf Dsouza
(74) *Attorney, Agent, or Firm* — Fish & Richardson P.C.

(57) ABSTRACT

The present disclosure relates to beam configuration methods. In one example method, a terminal device receives a first beam from a network device, where an identifier of a reference signal sent on the first beam is a first identifier. The terminal device configures a receive beam corresponding to the first beam based on a spatial reception parameter corresponding to a downlink synchronization signal associated with current measurement, where before receiving the first beam, the terminal device does not measure or report a second beam corresponding to the first identifier.

6 Claims, 5 Drawing Sheets

(56) References Cited

FOREIGN PATENT DOCUMENTS

| CN | 107171699 A | 9/2017 |
|---|---|---|
| CN | 107425948 A | 12/2017 |
| WO | 2016154809 A1 | 10/2016 |
| WO | 2016165128 A1 | 10/2016 |
| WO | 2017034607 A1 | 3/2017 |
| WO | 2017206100 A1 | 12/2017 |

OTHER PUBLICATIONS

Huawei, HiSilicon, "Beam indication for control and data channels," 3GPP TSG RAN WG1 Meeting 90bis, R1-1718238, Prague, Czech Republic, Oct. 9-13, 2017, 8 pages.

Huawei, HiSilicon, "Summary of remaining issues of beam measurement, reporting and indication," 3GPP TSG RAN WG1 Meeting Ad Hoc meeting, R1-1800100, Vancouver, Canada, Jan. 22-26, 2018, 13 pages.

3GPP TS 38.133 V15.0.0 (Dec. 2017), "3rd Generation Partnership Project; Technical Specification Group Radio Access Network; NR; Requirements for support of radio resource management (Release 15)," Dec. 2017, 41 pages.

3GPP TS 38.213 V15.0.0 (Dec. 2017), "3rd Generation Partnership Project; Technical Specification Group Radio Access Network; NR; Physical layer procedures for control (Release 15)," Dec. 2017, 56 pages.

3GPP TS 38.214 V15.0.0 (Dec. 2017), "3rd Generation Partnership Project; Technical Specification Group Radio Access Network; NR; Physical layer procedures for data (Release 15)," Dec. 2017, 71 pages.

3GPP TS 38.331 V15.0.0 (Dec. 2017), "3rd Generation Partnership Project;Technical Specification Group Radio Access Network NR; Radio Resource Control (RRC) protocol specification (Release 15)," Dec. 2017, 188 pages.

Huawei et al., "Beam measurement, reporting and indication," 3GPP TSG RAN WG1 Meeting #91, R1-1719422, Reno, USA, Nov. 27-Dec. 1, 2017, 11 pages.

Huawei et al., "Further details on beam indication," 3GPP TSG RAN WG1 Meeting #91,R1-1719806, Reno, USA, Nov. 27-Dec. 1, 2017, 12 pages.

Office Action issued in Chinese Application No. 201810055215.1 dated Apr. 27, 2020, 21 pages (with English translation).

PCT International Search Report and Written Opinion issued in International Application No. PCT/CN2019/071590 dated Feb. 27, 2019, 15 pages (with English translation).

Office Action issued in Chinese Application No. 201980007713.1 dated Mar. 29, 2021, 12 pages.

* cited by examiner

RRC configuration

BEAM CONFIGURATION METHOD AND APPARATUS

CROSS-REFERENCE TO RELATED APPLICATIONS

This application is a continuation of International Application No. PCT/CN2019/071590, filed on Jan. 14, 2019, which claims priority to Chinese Patent Application No. 201810055215.1, filed on Jan. 19, 2018. The disclosures of the aforementioned applications are hereby incorporated by reference in their entireties.

TECHNICAL FIELD

The present invention relates to the communications field, and in particular, to a beam configuration method and apparatus.

BACKGROUND

In a current wireless communications system (for example, NR, new radio), a beam is widely used for communication. A signal is sent, on a beam, in a specific direction in space, so that a higher antenna array gain can be implemented. A beam may be implemented by using a technical means such as beamforming. For example, an important research direction in high frequency (HF) communication is analog and digital hybrid beamforming. In this way, losses of a high-frequency signal that are caused by a transmission distance can be well resisted, and complexity and hardware costs can be controlled within an acceptable range.

Before receiving a transmit beam from a network device, user equipment (UE) needs to determine a related configuration of the transmit beam based on configuration information from the network device. When the UE receives the transmit beam from the base station, the UE needs to adjust a configuration of a receive beam of the UE to match the transmit beam. However, how to implement the pairing of a transmit beam and a receive beam in an NR communications system is still under discussion.

SUMMARY

A technical problem to be resolved in embodiments of the present invention is to provide a beam configuration method and apparatus, so that a transmit beam and a receive beam can be paired based on a spatial QCL relationship between antenna ports, thereby reducing a beam pairing time.

The method includes: receiving, by a terminal device, a first beam from a network device, where an identifier of a reference signal sent on the first beam is a first identifier; and configuring, by the terminal device based on a spatial reception parameter configured after a second beam corresponding to the first identifier is measured or reported last time, a receive beam corresponding to the first beam, that is, an identifier of a reference signal sent on the second beam is also the first identifier. There is a spatial QCL relationship between an antenna port of the reference signal sent on the first beam and an antenna port of the reference signal sent on the second beam.

The terminal device receives a signal on the first beam. The first identifier may be a reference signal identifier (RS-ID), for example, any one of a synchronization signal block identifier (SSB ID), a channel state information reference signal identifier (CSI-RS ID), a tracking reference signal identifier (TRS ID), a resource setting ID, and a resource set ID. A channel of the reference signal sent on the first beam may be a control channel, a traffic channel, or a broadcast channel. For example, the control channel includes a physical downlink control channel (PDCCH), the broadcast channel includes a physical broadcast channel (PBCH), and the traffic channel includes a physical downlink shared channel (PDSCH). Correspondingly, the reference signal sent on the first beam includes but is not limited to: a secondary synchronization signal (SSS), a primary synchronization signal (PSS), a physical downlink control channel-demodulation reference signal (PDCCH-DMRS), and a physical downlink shared channel-demodulation reference signal (PDSCH-DMRS), a phase trace reference signal (PTRS), a cell reference signal (CRS), and a tracking reference signal (TRS). A spatial reception parameter is used to indicate related configurations of a beam, including configurations of a main lobe direction, a beam gain, an antenna weight, an antenna panel, a transmission reference point, and the like.

This embodiment of the present invention is implemented, so that the terminal device configures an appropriate spatial reception parameter for the receive beam based on the spatial reception parameter that is configured after the terminal device measures or reports a beam having the same identifier last time, thereby reducing a time for pairing the receive beam and a transmit beam, and reducing a data transmission delay.

In a possible design, before the receiving, by a terminal device, a first beam from a network device, the method further includes:

receiving, by the terminal device, configuration information from the network device, where the configuration information includes a TCI state table and a TCI state ID that is of the first beam. An identifier corresponding to the TCI state ID in the TCI state table is the first identifier.

In a possible design, before the receiving, by the terminal device, configuration information from the network device, the method further includes:

receiving, by the terminal device, the second beam from the network device, where an identifier of a reference signal sent on the second beam is the first identifier; measuring, by the terminal device, the second beam; configuring, by the terminal device, a spatial reception parameter for the second beam after the measurement is completed; and associating, by the terminal device, the spatial reception parameter with the first identifier.

In a possible design, before the receiving, by the terminal device, configuration information from the network device, the method further includes: receiving, by the terminal device, the second beam from the network device; measuring, by the terminal device, the second beam; reporting, by the terminal device, a measurement result to the network device; configuring, by the terminal device, a spatial reception parameter for the second beam after the reporting is completed; and associating, by the terminal device, the spatial reception parameter with the first identifier.

In a possible design, the terminal device measures or reports the second beam within a prestored or pre-configured time length. For example, the time length is notified by the network device to the terminal device by using configuration information.

According to a second aspect, this application provides a beam configuration method. The method includes: receiving, by a terminal device, a first beam from a network device, where an identifier of a reference signal sent on the first beam is a first identifier; and configuring, by the terminal device based on a spatial reception parameter configured after a second beam corresponding to a second identifier is measured or reported last time, a receive beam corresponding to the first beam, where an identifier of a reference signal sent on the second beam is the second identifier, the first identifier and the second identifier have a spatial QCL relationship, and there is a spatial QCL relationship between an antenna port of the reference signal sent on the first beam and an antenna port of the reference signal sent on the second beam.

In a possible design, before the receiving, by a terminal device, a first beam from a network device, the method further includes:

receiving, by the terminal device, configuration information from the network device, where the configuration information includes at least one of a TCI state table and a TCI state ID that is of the first beam, the TCI state ID is used for beam indication, and an identifier corresponding to the TCI state ID in the TCI state table is the second identifier.

In a possible design, before the receiving, by the terminal device, configuration information from the network device, the method further includes:

receiving, by the terminal device, the second beam from the network device; measuring, by the terminal device, the second beam; configuring, by the terminal device, a spatial reception parameter for the second beam after the measurement is completed; and associating, by the terminal device, the spatial reception parameter with the second identifier.

In a possible design, before the receiving, by the terminal device, configuration information from the network device, the method further includes:

receiving, by the terminal device, the second beam from the network device, where an identifier of a reference signal sent on the second beam is the second identifier; measuring the second beam; reporting, by the terminal device, a measurement result to the network device; configuring, by the terminal device, a spatial reception parameter for the second beam after the reporting is completed; and associating, by the terminal device, the spatial reception parameter with the second identifier. The terminal device configures a receive beam based on the spatial reception parameter, and receives, on the receive beam, a downlink signal from the network device.

In a possible design, the second beam is measured or reported within a prestored or pre-configured time length.

In a possible design, the first identifier is a reference RS-ID or the second identifier is a reference RS-ID.

In a possible design, a type of the reference signal sent on the first beam is the same as a type of the reference signal sent on the second beam.

In a possible design, the reference signal sent on the first beam or the reference signal sent on the second beam is an aperiodic signal.

This embodiment of the present invention is implemented so that when receiving a transmit beam from the network device, the terminal device configures a current receive beam based on a spatial reception parameter of another beam that is measured or reported last time and that is associated and has a spatial QCL relationship with the transmit beam. In this way, the terminal device configures an appropriate spatial reception parameter for the beam from the network device, thereby reducing a time for pairing the transmit beam and the receive beam, and reducing a data transmission delay.

According to a third aspect, this application provides a beam configuration method, including: receiving, by a terminal device, a first beam from a network device, where an identifier of a reference signal sent on the first beam is a first identifier; and configuring, by the terminal device, a receive beam corresponding to the first beam based on a spatial reception parameter corresponding to a downlink synchronization signal in current synchronization, where before receiving the first beam, the terminal device does not measure or report a second beam corresponding to the first identifier.

In a possible design, the terminal device does not measure or report the second beam corresponding to the first identifier within a prestored or pre-configured time length.

According to a fourth aspect, this application provides a beam configuration method, including: receiving, by a terminal device, a first beam from a network device where an identifier of a reference signal sent on the first beam is a first identifier; and configuring, by the terminal device, a receive beam corresponding to the first beam based on a spatial reception parameter corresponding to a downlink synchronization signal in current synchronization where the first identifier and a second identifier have a spatial QCL relationship, and where before receiving the first beam, the terminal device does not measure a second beam corresponding to the first identifier, and does not measure a third beam corresponding to the second identifier, and there is a spatial QCL relationship between an antenna port of the reference signal sent on the first beam, an antenna port of a reference signal sent on the second beam, and an antenna port of a reference signal sent on the third beam.

In a possible design, the terminal device does not measure the second beam corresponding to the first identifier within a prestored or pre-configured time length, and does not measure the third beam corresponding to the second identifier within the time length. For example, the time length is notified by the network device to the terminal device by using configuration information, and a unit of the time length includes but is not limited to any one of a slot, a subframe, and an OFDM symbol.

According to a fifth aspect, this application provides a beam configuration method, including: receiving, by a terminal device, a first beam from a network device, where an identifier of a reference signal sent on the first beam is a first identifier; and configuring, by the terminal device, a receive beam corresponding to the first beam based on a spatial reception parameter corresponding to a downlink synchronization signal in current synchronization, where the first identifier and a second identifier have a spatial QCL relationship, before receiving the first beam, the terminal device does not report a second beam corresponding to the first identifier, and does not report a third beam corresponding to the second identifier, and there is a spatial QCL relationship between an antenna port of the reference signal sent on the first beam, an antenna port of a reference signal sent on the second beam, and an antenna port of a reference signal sent on the third beam.

In a possible design, the terminal device does not report the second beam corresponding to the first identifier within a prestored or pre-configured time length, and does not report the third beam corresponding to the second identifier within the time length.

According to a sixth aspect, this application provides a beam configuration apparatus, including:

a receiving unit, configured to receive a first beam from a network device, where an identifier of a reference signal sent on the first beam is a first identifier; and a processing unit, configured to configure, based on a spatial reception parameter configured after a second beam corresponding to the first identifier is measured or reported last time, a receive beam corresponding to the first beam.

In a possible design, the receiving unit is further configured to receive configuration information from the network device, where the configuration information includes at least one of a transmission configuration indicator (TCI) state table and a TCI state identifier (ID) that is of the first beam, and an identifier corresponding to the TCI state ID in the TCI state table is the first identifier.

In a possible design, the receiving unit is further configured to receive the second beam from the network device, where an identifier of a reference signal sent on the second beam is the first identifier; and the processing unit is further configured to associate the spatial reception parameter of the second beam with the first identifier, where the spatial reception parameter of the second beam is configured or reported after the second beam is measured or reported.

In a possible design, the second beam is measured or reported within a prestored or pre-configured time length.

According to a seventh aspect, this application provides a beam configuration apparatus, including:

a receiving unit, configured to receive a first beam from a network device, where an identifier of a reference signal sent on the first beam is a first identifier; and a processing unit, configured to configure, based on a spatial reception parameter configured after a second beam corresponding to a second identifier is measured or reported last time, a receive beam corresponding to the first beam, where the first identifier and the second identifier have a spatial quasi co-location spatial QCL relationship.

In a possible design, the receiving unit is further configured to receive configuration information from the network device, where the configuration information includes at least one of a TCI state table and a TCI state ID that is of the first beam, and an identifier corresponding to the TCI state ID in the TCI state table is the second identifier.

In a possible design, the receiving unit is further configured to receive the second beam from the network device, where an identifier of a reference signal sent on the second beam is the second identifier; and the processing unit is further configured to associate the spatial reception parameter of the second beam with the second identifier, where the spatial reception parameter of the second beam is configured after the second beam is measured or reported.

In a possible design, the second beam is measured or reported within a prestored or pre-configured time length.

In a possible design, the first identifier is a reference RS-ID or the second identifier is a reference RS-ID.

In a possible design, a type of the reference signal sent on the first beam is the same as a type of the reference signal sent on the second beam.

In a possible design, the reference signal sent on the first beam or the reference signal sent on the second beam is an aperiodic signal.

An eighth aspect of this application provides a beam configuration apparatus, including:

a receiving unit, configured to receive a first beam from a network device, where an identifier of a reference signal sent on the first beam is a first identifier; and a processing unit, configured to configure a receive beam corresponding to the first beam based on a spatial reception parameter corresponding to a downlink synchronization signal in current synchronization, where before the first beam is received, the second beam corresponding to the first identifier is not measured, an identifier of a reference signal sent on the second beam is the first identifier, and there is a spatial QCL relationship between an antenna port of the reference signal sent on the first beam and an antenna port of the reference signal sent on the second beam.

In a possible design, the second beam corresponding to the first identifier is not measured within a prestored or pre-configured time length.

A ninth aspect of this application provides a beam configuration apparatus, including:

a receiving unit, configured to receive a first beam from a network device, where an identifier of a reference signal sent on the first beam is a first identifier; and a processing unit, configured to configure a receive beam corresponding to the first beam based on a spatial reception parameter corresponding to a downlink synchronization signal in current synchronization, where before the first beam is received, the second beam corresponding to the first identifier is not reported, and there is a spatial QCL relationship between an antenna port of the reference signal sent on the first beam and an antenna port of a reference signal sent on the second beam.

In a possible design, the second beam corresponding to the first identifier is not reported within a prestored or pre-configured time length.

A tenth aspect of this application provides a beam configuration apparatus, including:

a receiving unit, configured to receive a first beam from a network device, where an identifier of a reference signal sent on the first beam is a first identifier; and a processing unit, configured to configure a receive beam corresponding to the first beam based on a spatial reception parameter corresponding to a downlink synchronization signal in current synchronization, where the first identifier and the second identifier have a spatial QCL relationship, before the first beam is received, the second beam corresponding to the first identifier is not measured, and a third beam corresponding to the second identifier is not measured, and there is a spatial QCL relationship between an antenna port of the reference signal sent on the first beam, an antenna port of a reference signal sent on the second beam, and an antenna port of a reference signal sent on the third beam.

In a possible design, the second beam corresponding to the first identifier is not measured within a prestored or pre-configured time length, and the third beam corresponding to the second identifier is also not measured within the time length.

In a possible design, the receiving unit is further configured to receive configuration information from the network device, where the configuration information includes at least one of a TCI state table and a TCI state ID that is of the first beam. The TCI state ID corresponds to the second identifier in the TCI state table, to be specific, the second identifier is used as a reference RS-ID and the first identifier and the second identifier have a spatial QCL relationship.

According to an eleventh aspect, this application provides a beam configuration apparatus, including:

a receiving unit, configured to receive a first beam from a network device, where an identifier of a reference signal sent on the first beam is a first identifier; and a processing unit, configured to configure a receive beam corresponding to the first beam based on a spatial reception parameter corresponding to a downlink synchronization signal in current synchronization, where the first identifier and the second identifier have a spatial QCL relationship, before the first beam is received, the second beam corresponding to the first identifier is not reported, and a third beam corresponding to the second identifier is not reported, and there is a spatial QCL relationship between an antenna port of the reference signal sent on the first beam, an antenna port of a reference signal sent on the second beam, and an antenna port of a reference signal sent on the third beam.

In a possible design, the second beam corresponding to the first identifier is not reported within a prestored or pre-configured time length, and the third beam corresponding to the second identifier is also not reported within the time length.

In a possible design, the receiving unit is further configured to receive configuration information from the network device, where the configuration information includes a TCI state table and a TCI state ID that is of the first beam. The TCI state ID corresponds to the second identifier in the TCI state table, to be specific, the first identifier and the second identifier have a spatial QCL relationship and the second identifier is a reference RS-ID.

According to a twelfth aspect, this application provides a computer storage medium, and the computer storage medium includes a program designed to perform the foregoing aspects.

According to a thirteenth aspect, an embodiment of this application provides a computer program product, where the computer program product stores an instruction or computer program, and when the instruction or computer program is executed by a computer, the computer is enabled to perform procedures in the foregoing aspects.

BRIEF DESCRIPTION OF DRAWINGS

To describe the technical solutions in the embodiments of the present invention or in the background more clearly, the following describes the accompanying drawings required for describing the embodiments of the present invention or the background.

DESCRIPTION OF EMBODIMENTS

The embodiments of this application may be applied to a wireless communications system. It should be noted that the wireless communications system mentioned in the embodiments of this application includes but is not limited to: a narrowband Internet of things (NB-IoT) system, a global system for mobile communications (GSM), an enhanced data rate for GSM evolution (EDGE) system, a wideband code division multiple access (WCDMA) system, a code division multiple access 2000 (CDMA2000) system, a time division-synchronous code division multiple access (TD-SCDMA) system, and three major application scenarios in a long term evolution (LTE) system, a new radio (NR) system, and a next-generation 5G mobile communications system, namely, enhanced mobile broadband (eMBB) URLLC, and massive machine-type communications (mMTC).

In the embodiments of this application, a terminal device includes but is not limited to a mobile station (MS), a mobile terminal device, a cellular telephone, a handset, portable equipment, and the like. The terminal device may communicate with one or more core networks through a radio access network (RAN). For example, the terminal device may be a cellular telephone, a computer having a wireless communication function, or the like, or the terminal device may be a portable, pocket-sized, handheld, computer built-in, or vehicle-mounted mobile apparatus or device.

Figure 1A:
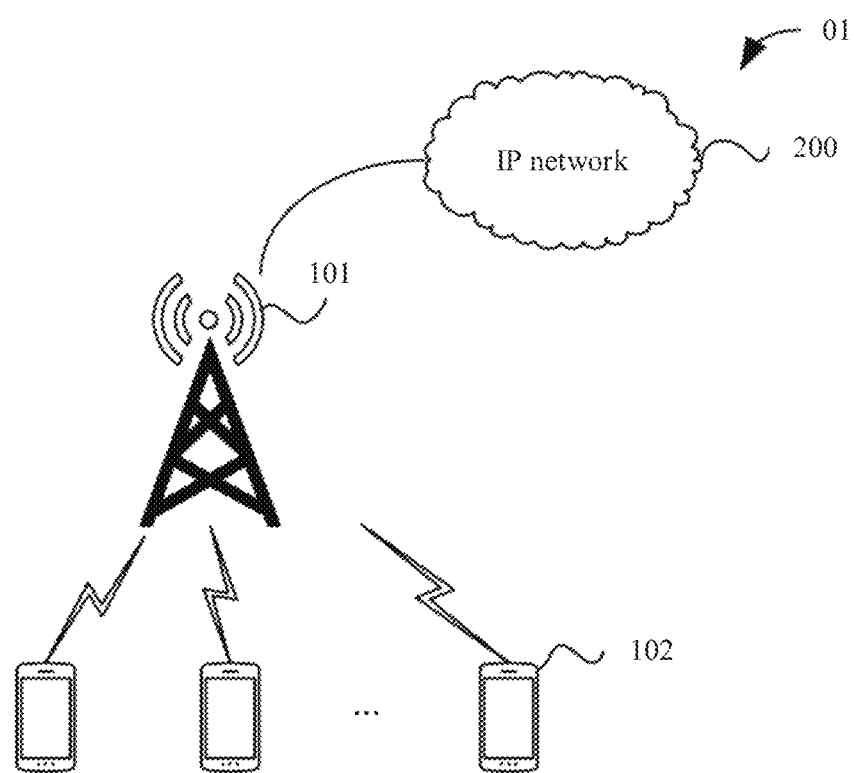
FIG. 1A is a network architecture diagram of a communications system according to an embodiment of the present invention.

FIG. 1A is a schematic architectural diagram of a communications system according to this application.

As shown in FIG. 1A, a communications system 01 includes a network device 101 and a terminal device 102. When the communications system 01 includes a core network, the network device 101 may further be connected to the core network. The network device 101 may further communicate with an internet protocol (IP) network 200, for example, the internet, a private IP network, or another data network. The network device provides a service for a terminal device within coverage of the network device. For example, referring to FIG. 1A, the network device 101 provides wireless access for one or more terminal devices within coverage of the network device 101. In addition, network devices may further communicate with each other.

The network device 101 may be a device configured to communicate with the terminal device. For example, the network device 101 may be a base transceiver station (BTS) in a GSM system or CDMA system, or may be a NodeB (NB) in a WCDMA system, or may be an evolved NodeB (eNB or eNodeB) in an LTE system or a network side device in a 5G network. Alternatively, the network device may be a relay station, an access point, a vehicle-mounted device, or the like. In a device-to-device (D2D) communications system, the network device may alternatively be a terminal device playing a role of a base station. The terminal device may include a handheld device, a vehicle-mounted device, a wearable device, or a computing device that has a wireless communication function, another processing device connected to a wireless modem, user equipment (UE) in various forms, a mobile station (MS), or the like.

Figure 1B:
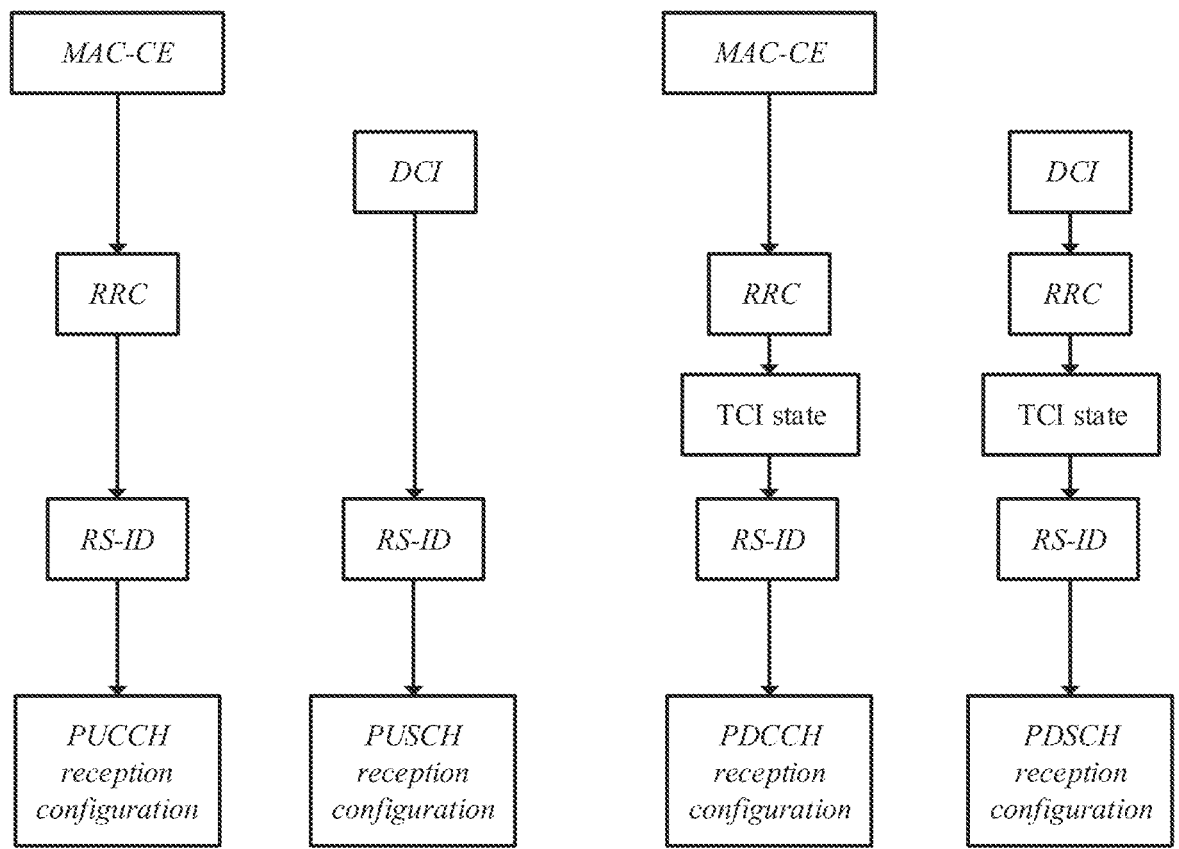
FIG. 1B is a schematic diagram of indicating a beam by using an RS-ID according to an embodiment of the present invention.

FIG. 1B is a schematic diagram of a beam indication method in new radio (NR) according to an embodiment of the present invention. A downlink beam indication (for example, a beam indication of a reference signal (RS) and a beam indication of a channel) is implemented by being associated with an RS-ID in a transmission configuration indicator (TCI) state table.

Specifically, the base station configures a TCI state table (corresponding to TCI-states in 38.331) by using radio resource control (RRC) higher layer signaling. Each TCI state table includes M TCI states (corresponding to TCI-RS-Set in 38.331), where M is an integer greater than 1. Each TCI state includes a TCI state ID (TCI-RS-SetID), one or two types of QCL type indications (QCL-Type A/B/C/D), and reference RS-IDs corresponding to the type indications. The QCL types include the following several types:

QCL-Type A: {Doppler frequency shift, Doppler spread, average delay, delay spread};

QCL-Type B: {Doppler frequency shift, Doppler spread};

QCL-Type C: {average delay, Doppler frequency shift}; and

QCL-Type D: {spatial reception parameter}.

QCL-Type D represents spatial quasi co-location. When a receive beam needs to be indicated, the base station indicates, by using higher layer signaling or control information, a TCI state including spatial quasi co-location information in a table, UE reads, based on the TCI state, a reference RS-ID corresponding to the QCL-Type D. and then the UE may perform reception based on a currently maintained spatial reception configuration (receive beam) corresponding to the RS-ID. According to 38.214, if a TCI state includes a spatial quasi co-location indication (QCL-Type D), a corresponding reference RS of the spatial quasi co-location indication may be an SS/PBCH block or a periodic or semi-persistent CSI-RS. Beam indications (TCI indications) of different downlink channels are completed at different locations.

A beam indication of a PDCCH is associated with one or more TCI states by using RRC configured higher layer signaling tci-StatesPDCCH, and when a quantity of associated TCI states is greater than 1, one of the TCI states is selected by using MAC-CE higher layer signaling.

A beam indication of a PDSCH is indicated by a state associated with a TCI field in DCI transmitted on the PDCCH. In an NR standard, a length of a TCI field included in DCI is 3 bits (corresponding to eight TCI states). When a quantity M of TCI states included in RRC signaling is less than 8, an activated TCI state is directly mapped into the TCI field; otherwise, a maximum of eight TCI states that participate in mapping are indicated by using higher layer signaling. When the higher layer signaling indicates that the TCI field does not appear in the DCI, the UE reuses the beam indication of the control channel to receive a data channel.

For uplink transmission, in NR, a spatial quasi co-location relationship is not defined. An uplink beam indication is directly implemented by using an RS-ID.

A beam indication of a PUCCH is indicated by an RRC parameter PUCCH-Spatial-relation-info. The parameter may include one or more RS-IDs. When the parameter includes a plurality of RS-IDs, one of the RS-IDs is selected by using MAC-CE higher layer signaling. Content of the beam indication of the PUCCH may be an uplink or downlink RS-ID, including an SSB ID, a CRI, or an SRI, indicating that it is recommended that the UE perform uplink transmission by using a corresponding beam for receiving/sending a downlink/uplink RS.

Beam information of the PUSCH is configured by using the SRI in the DCI.

In the foregoing existing beam indication solutions, the RS-ID is finally used for indication. In uplink, a beam is directly indicated by using an RS-ID, and in downlink, a beam is indicated by using an associated TCI state that includes the RS-ID and the QCL type-D. After obtaining an RS-ID corresponding to beam indication information, the UE performs reception by using a locally associated spatial reception configuration corresponding to the RS-1D. In FIG. 1B, beam indication procedures of an uplink physical channel and a downlink physical channel are summarized.

Figure 1C:
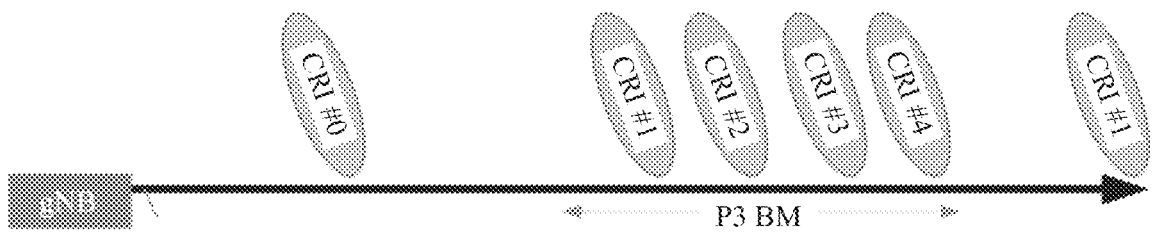
FIG. 1C is a schematic diagram of beam pairing according to an embodiment of the present invention.
Figure 1C:

FIG. 1C is a solution of a beam configuration method according to an embodiment of the present invention. In this solution, an RS-ID is used as identification information for indicating a receive beam. There are two potential problems. One problem is that the RS-ID does not fixedly correspond to a transmit beam, a same RS-ID may correspond to different transmit beams at different moments (depending on a configuration of a base station). The other problem is that even if the RS-ID fixedly corresponds to a same transmit beam, the UE may have different reception configurations at different moments as a time and a channel environment change. In other words, the RS-ID may correspond to a plurality of different reception configurations. A beam mismatch may occur between the base station and the UE due to different understandings of a reception configuration corresponding to a current RS-ID.

Refer to the beam configuration process shown in FIG. 1C. In an initial state, the UE maintains, in a manner such as an antecedent measurement, a receive beam (RX 0) corresponding to a transmit RS-ID of CRI #0. Then, the base station initiates a beam sweeping process (P3 BM, Phase3 beam management). The base station notifies, by using higher layer signaling, the UE that the same beam is to be used to send RS resources CRI #1 to CRI #4, and indicates, to the UE by using QCL information, that the UE may use, for receiving, the receive beam corresponding to the CRI #0. During sending of the CRI #1 to the CRI #4 by the base station, the UE trains a receive beam of the UE, and updates a better receive beam RX 1. In this case, the UE maintains corresponding receive beams of the CRI #1 to the CRI #4 as the RX 1. However, the receive beam corresponding to the CRI #0 is still the RX 0. Then, the base station sends, by using the foregoing beam again, the RS resource CRI #1, and indicates, to the UE by using QCL information, that the UE may receive the RS resource CRI #1 on the receive beam corresponding to the CRI #0. In this case, from a perspective of the base station, because the CRI #1 to the CRI #4 are sent by using the same transmit beam, the UE should use, for receiving, the new beam trained by using the CRI #1 to the CRI #4 just now. From a perspective of the UE, QCL information of the CRI #1 points to the CRI #0. In this case, a receive beam that is of the CRI #0 and that is maintained by the UE is still the RX 0. Therefore, the RX 0 is used for receiving, and a beam mismatch may occur between the UE and the base station.

Figure 2:
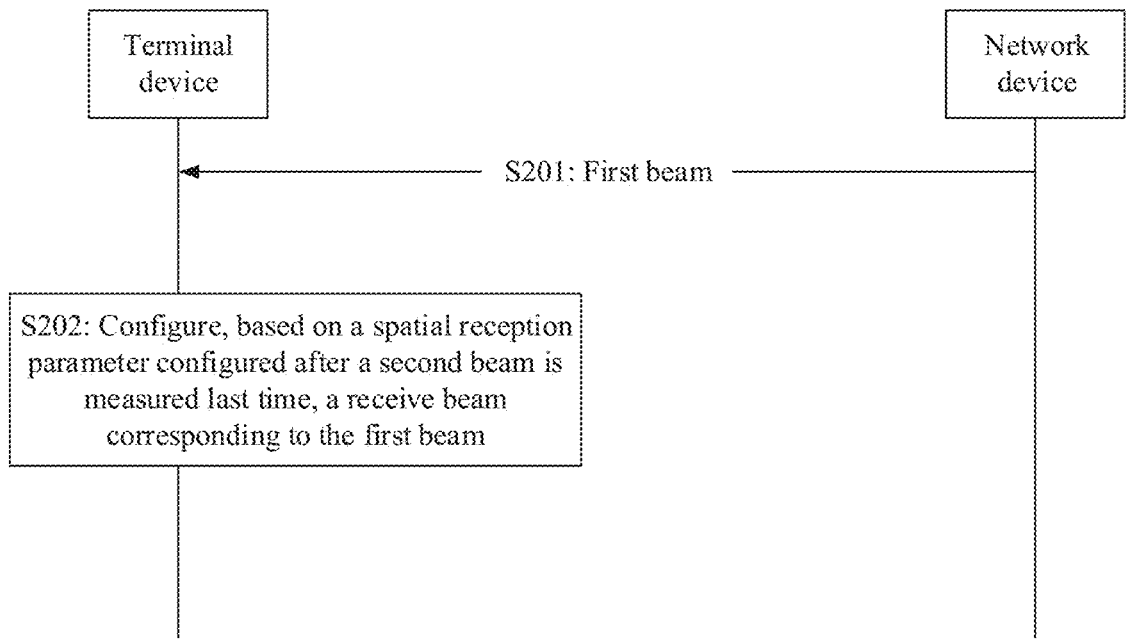
FIG. 2 is a schematic flowchart of a beam configuration method according to an embodiment of the present invention.

FIG. 2 is a schematic flowchart of a beam configuration method according to an embodiment of the present invention. In this embodiment of the present invention, the method includes the following steps.

S201: A network device sends a first beam to a terminal device, and the terminal device receives the first beam from the network device.

Specifically, an identifier of a reference signal sent on the first beam is a first identifier, and the first identifier may be an RS-ID, for example, any one of an SSB ID, a CSI-RS ID, a TRS ID, a resource setting ID, and a resource set ID. A channel of the reference signal sent on the first beam may be a control channel, a traffic channel, or a broadcast channel. For example, the control channel includes a PDCCH, the traffic channel includes a physical downlink shared channel (PDSCH), and the broadcast channel includes a PBCH. Correspondingly, the reference signal sent on the first beam includes but is not limited to an SSS, a PSS, a PDCCH-DMRS, a PDSCH-DMRS, a PTRS, a CRS, a CSI-RS, and a TRS. A spatial reception parameter is used to indicate related configurations of a beam, including configurations of a main lobe direction, a beam gain, an antenna weight, an antenna panel, a transmission reference point, and the like.

S202: The terminal device configures, based on a spatial reception parameter configured after a second beam is measured last time, a receive beam corresponding to the first beam.

Embodiment 1

An identifier of a reference signal sent on the second beam is the same as the identifier of the reference signal sent on the first beam, that is, the identifier of the reference signal sent on the second beam is the first identifier. Before receiving the first beam, the terminal device measures the second beam corresponding to the first identifier, and then the terminal device prestores an association relationship. The terminal device may determine, based on the association relationship, the spatial reception parameter (spatial RX parameters) associated with the first identifier, and the terminal device configures, based on the spatial reception parameter, the receive beam corresponding to the first beam.

The terminal device side may maintain the association relationship between a downlink reference signal identifier number and a receive beam number. For example, refer to the following table.

TABLE 1

| Downlink reference signal identifier number | Receive beam number |
|---|---|
| Downlink reference signal identifier #0 | Receive beam #0 |
| Downlink reference signal identifier #1 | Receive beam #1 |
| Downlink reference signal identifier #2 | Receive beam #2 |
| Downlink reference signal identifier #3 | Receive beam #3 |

It should be noted that the spatial reception parameter represents the configurations of the receive beam, for example, the configurations of the beam direction, the beam gain, the antenna weight, the antenna panel, the transmission reference point, and the like. The spatial reception parameter in this embodiment may also be referred to as a beam configuration parameter, a reception configuration, a spatial reception configuration, or another name, and this is not limited in this embodiment.

Optionally, the terminal device receives configuration information from the network device, where the configuration information includes at least one of a TCI state table and a TCI state ID that is of the first beam.

Specifically, the TCI state table may include a plurality of TCI states, and each TCI state includes a TCI state ID, a QCL type, and a reference RS-ID. The TCI state ID may be an index value. The terminal device may search the TCI state table for a corresponding reference RS-ID and QCL type by using the TCI state ID carried in the configuration information. In this embodiment, a QCL type corresponding to the TCI state ID in the TCI state table is a Type D, and a corresponding reference RS-ID is the first identifier.

For example, referring to Table 2, for example, Table 2 is a schematic structural diagram of a TCI state table according to an embodiment of the present invention. The TCI state table includes M TCI states, and each TCI state corresponds to one ID. One TCI state includes one or more reference signal sets, and each reference signal set includes one or more reference signal identifiers and corresponding QCL types. In addition, the TCI state table may further include carrier information, BWP information, or other information. For ease of description, in a subsequent part of this specification, a simplified TCI state table is used as an example to present key information, as shown in Table 3. Table 3 includes three TCI states. It is assumed that a TCI state ID for beam indication is 0, and the identifier of the reference signal sent on the first beam is an RS-ID #0. The terminal device finds, based on the following TCI state table, that a QCL type corresponding to the TCI state ID is a Type D, and the reference RS-ID is an RS-ID #0.

TABLE 2

| TCI state index | RS-set index | QCL indication | | Carrier, BWP, or other information |
|---|---|---|---|---|
| TCI-ID #0 | RS set #1 | RS-ID #1 | QCL-Type 1 | ... |
| | | ... | ... | |
| | | RS-ID #M | QCL-Type M | |
| | ... | ... | | |
| | RS set #N | | | |
| TCI-ID #1 | ... | | | |
| ... | | | | |
| TCI-ID #M | | | | |

TABLE 3

TCI state table

| TCI state ID | QCL Type | Reference RS-ID |
|---|---|---|
| 0 | Type D | RS-ID #0 |
| 1 | Type A | RS-ID #2 |
| 2 | Type A | RS-ID #3 |

It should be noted that, before receiving the first beam, the terminal device measures the second beam, but a beam indication reference RS-ID in the configuration information is not the first identifier. In this case, when receiving the first beam, the terminal device considers that the second beam is not measured, and the terminal device may perform configuration based on a spatial reception parameter of a downlink synchronization signal in a current synchronization.

Optionally, before receiving, by the terminal device, configuration information from the network device, the method further includes:

receiving, by the terminal device, the second beam from the network device, where the identifier of the reference signal sent on the second beam is the first identifier; and associating, by the terminal device, the spatial reception parameter of the second beam with the first identifier, where the spatial reception parameter of the second beam is configured after the second beam is measured.

Specifically, the terminal device prestores or pre-configures configuration information, where the configuration information includes but is not limited to a TCI state table, a TCI state ID, an identifier (which is the first identifier in this case) of a to-be-measured beam, time-frequency configuration information, a measurement quantity, and a reporting configuration. The time-frequency configuration information is a configuration of a time-frequency resource of the reference signal, for example, a time domain position and a frequency domain position of the time-frequency resource. The measurement quantity is a related parameter to be measured. The configuration information may be sent by using higher layer signaling, for example, may be sent by using RRC signaling or a MAC-CE message. There are two cases for the reporting configuration: reporting is required and reporting is not required. The terminal device measures the second beam based on the measurement quantity and configures a spatial reception parameter for the second beam after the measurement is completed. The terminal device associates the first identifier with the spatial reception parameter, and stores an association relationship between the first identifier and the spatial reception parameter. Then, the terminal device configures a receive beam based on the spatial reception parameter, and receives, on the receive beam, a downlink signal from the network device.

Optionally, the terminal device measures the second beam within a prestored or pre-configured time length. The time length may be carried in the configuration information.

The time length may be notified by the network device to the terminal device. For example, the terminal device is notified by using at least one of radio resource control RRC signaling, system information SI, remaining system information RMSI, a new radio system information block 1 NR SIB 1, MAC-CE signaling, downlink control information DCI, a physical broadcast channel PBCH, and a PDCCH. Alternatively, the time length may be a fixed value. A granularity of the time length includes but is not limited to at least one of a slot, a subframe, and an OFDM symbol.

Embodiment 2

A first identifier and a second identifier have a QCL relationship, to be specific, there is a spatial QCL relationship between an antenna port of a reference signal corresponding to the first identifier and an antenna port of a reference signal corresponding to the second identifier. Before receiving a first beam, a terminal device measures a second beam corresponding to the first identifier. The terminal device may determine, based on configuration information, that the first identifier and the second identifier have a spatial QCL relationship, and then determine, based on a prestored association relationship, a spatial reception parameter associated with the second identifier. The terminal device configures, based on the spatial reception parameter, a receive beam corresponding to the first beam. An identifier of the reference signal sent on the first beam is the first identifier, and an identifier of the reference signal sent on the second beam is the second identifier.

It should be noted that the spatial reception parameter represents the configurations of the receive beam, for example, the configurations of the beam direction, the beam gain, the antenna weight, the antenna panel, the transmission reference point, and the like. The spatial reception parameter in this embodiment may also be referred to as a beam configuration parameter, a reception configuration, a spatial reception configuration, or another name, and this is not limited in this embodiment.

Optionally, before receiving, by the terminal device, the first beam from the network device, the method further includes:

receiving, by the terminal device, configuration information from the network device, where the configuration information includes at least one of a TCI state table and a TCI state ID that is of the first beam.

Specifically, the TCI state table may include a plurality of TCI states, and each TCI state includes a TCI state ID, a QCL type, and a reference RS-ID. The TCI state ID may be an index value. The terminal device may search the TCI state table for a corresponding reference RS-ID and QCL type by using the TCI state ID carried in the configuration information. In this embodiment, a QCL type corresponding to the TCI state ID in the TCI state table is a Type D, and a corresponding reference RS-1D is the second identifier.

For example, Table 4 is a schematic structural diagram of a TCI state table according to an embodiment of the present invention. The TCI state table includes three TCI states. It is assumed that the identifier of the reference signal corresponding to the first beam is an RS-ID #0, and a TCI state ID for beam indication is 2. It is found in the following TCI state table that a QCL type corresponding to the TCI state ID is a Type A. and a reference RS is an RS-ID #1.

TABLE 4

TCI state table

| TCI state ID | QCL Type | RS-ID |
| --- | --- | --- |
| 0 | Type D | RS-ID #0 |
| 1 | Type A | RS-ID #2 |
| 2 | Type A | RS-ID #1 |

Optionally, before receiving, by the terminal device, configuration information from the network device, the method further includes:

receiving, by the terminal device, the second beam from the network device, where an identifier of a reference signal sent on the second beam is the second identifier; and associating, by the terminal device, the spatial reception parameter of the second beam with the second identifier, where the spatial reception parameter of the second beam is configured after the second beam is measured.

Specifically, the terminal device prestores or pre-configures configuration information, where the configuration information includes but is not limited to a TCI state table, a TCI state ID (for indicating the second beam), an identifier (which is the first identifier in this case) of a to-be-measured beam, reference signal time-frequency configuration information, a measurement quantity, and a reporting configuration. The time-frequency configuration information is a configuration of a time-frequency resource of the reference signal, for example, a time domain position and a frequency domain position of the time-frequency resource. The measurement quantity is a related parameter to be measured. The configuration information may be sent by using higher layer signaling, for example, may be sent by using RRC signaling or a MAC-CE message. There are two cases for the reporting configuration: reporting is required and reporting is not required. The terminal device measures the second beam based on the measurement quantity and configures a spatial reception parameter for the second beam after the measurement is completed. The terminal device associates the first identifier with the spatial reception parameter, and stores an association relationship between the first identifier and the spatial reception parameter. Then, the terminal device configures a receive beam based on the spatial reception parameter, and receives, on the receive beam, a downlink signal from the network device.

Optionally, the terminal device measures the second beam in a prestored or pre-configured time length. The time length may be notified by the network device to the terminal device. For example, the terminal device is notified by using at least one of radio resource control RRC signaling, system information SI, remaining system information RMSI, a new radio system information block 1 NR SIB 1, MAC-CE signaling, downlink control information DCI, a physical broadcast channel PBCH, and a PDCCH. Alternatively, the time length may be a fixed value. A granularity of the time length includes but is not limited to at least one of a slot, a subframe, and an OFDM symbol.

Optionally, the first identifier is a reference RS-1D or the second identifier is a reference RS-ID.

For example, the first identifier is an RS-ID #0, and the second identifier is an RS-ID #1. The RS-ID #0 may be a reference RS-ID in an RS-ID #1 beam indication TCI state, or the RS-ID #1 is a reference RS-ID corresponding to an RS-ID #0 beam indication TCI state.

Optionally, a type of the reference signal corresponding to the first identifier is the same as a type of the reference signal corresponding to the second identifier.

For example, the reference signal corresponding to the first identifier is a CS-RS, and the reference signal corresponding to the second identifier is also a CSI-RS. For another example, the reference signal corresponding to the first identifier is an SSB, and the reference signal corresponding to the second identifier is also an SSB.

Optionally, the reference signal corresponding to the first identifier or the reference signal corresponding to the second identifier is an aperiodic signal.

It should be noted that, in Embodiment 1 and Embodiment 2, the first beam and the second beam may be a same beam, that is, spatial transmit parameters (including configurations of at least one of a beam direction, a beam gain, an antenna weight, and the like) of the first beam and the second beam are the same. Alternatively, the first beam and the second beam may be different beams, that is, spatial transmit parameters of the two beams are different.

It should be noted that, in Embodiment 1 and Embodiment 2, a possible value of the prestored or pre-configured time length includes at least one of the following:

(a) a time period in which current or latest $k^{th}$ RRC signaling is effective;

(b) a time period in which a current or latest $k^{th}$ MAC-CE message is effective;

(c) a time period before k time units, where the time unit may be an OFDM symbol, a subframe, a time of a frame, a millisecond unit, or the like;

(d) a time period before latest $k^{th}$ RRC signaling being effective; and (e) a time period before a latest $k^{th}$ MAC-CE message being effective.

It should be noted that, according to the foregoing embodiments, the terminal device configures, based on the spatial reception parameter configured after the second beam is measured in the preset time length, the receive beam corresponding to the first beam.

The foregoing embodiments are implemented, so that the terminal device configures an appropriate spatial reception parameter for the receive beam based on the spatial reception parameter that is configured after the terminal device measures a transmit beam having the same identifier last time, thereby reducing a time for pairing the receive beam and the transmit beam, and reducing a data transmission delay.

Figure 3:
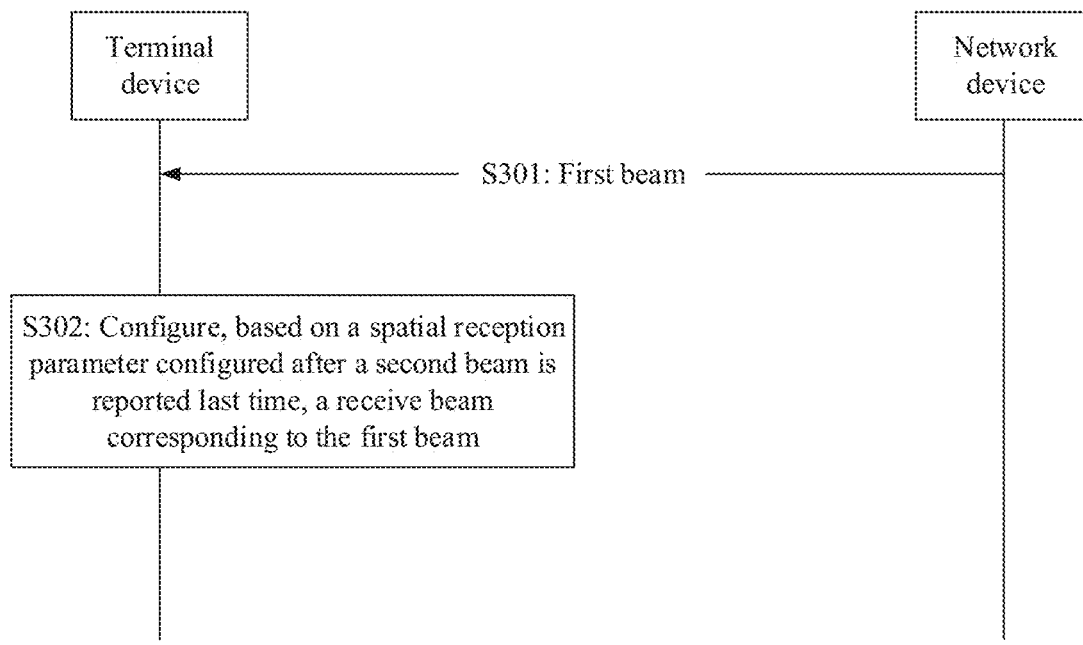
FIG. 3 is another schematic flowchart of a beam configuration method according to an embodiment of the present invention.

FIG. 3 is a schematic flowchart of another beam configuration method according to an embodiment of the present invention. In this embodiment of the present invention, the method includes the following steps.

S301: A network device sends a first beam to a terminal device, and the terminal device receives the first beam from the network device.

Specifically, an identifier of a reference signal sent on the first beam is a first identifier, and the first identifier may be an RS-ID, for example, any one of an SSB ID, a CSI-RS ID, a TRS ID, a resource setting ID, and a resource set ID. A channel of the reference signal sent on the first beam may be a control channel, a traffic channel, or a broadcast channel. For example, the control channel includes a PDCCH, the traffic channel includes a physical downlink shared channel (PDSCH), and the broadcast channel includes a PBCH. Correspondingly, the reference signal sent on the first beam includes but is not limited to an SSS, a PSS, a PDCCH-DMRS, a PDSCH-DMRS, a PTRS, a CRS, a CSI-RS, and a TRS. A spatial reception parameter is used to indicate related configurations of a beam, including configurations of a main lobe direction, a beam gain, an antenna weight, an antenna panel, a transmission reference point, and the like.

S302: The terminal device configures, based on the spatial reception parameter configured after a second beam is reported last time, a receive beam corresponding to the first beam.

Embodiment 1

An identifier of a reference signal sent on the second beam is the same as the identifier of the reference signal sent on the first beam, that is, the identifier of the reference signal sent on the second beam is also the first identifier. Before receiving the first beam, the terminal device reports the second beam corresponding to the first identifier. It should be noted that reporting described in this embodiment specifically includes a process of measuring a beam to obtain a measurement result, and then sending the measurement result to the network device. The terminal device prestores an association relationship. The terminal device may determine, based on the association relationship, the spatial reception parameter associated with the first identifier, and the terminal device configures, based on the spatial reception parameter, the receive beam corresponding to the first beam. There is a spatial QCL relationship between an antenna port of the reference signal sent on the first beam and an antenna port of the reference signal sent on the second beam. It should be noted that the spatial reception parameter represents the configurations of the receive beam, for example, the configurations of the beam direction, the beam gain, the antenna weight, the antenna panel, the transmission reference point, and the like. The spatial reception parameter in this embodiment may also be referred to as a beam configuration parameter, a reception configuration, a spatial reception configuration, or another name, and this is not limited in this embodiment.

Optionally, the terminal device receives configuration information from the network device, where the configuration information includes a TCI state table and a TCI state ID that is of the first beam.

Specifically, the TCI state table may include a plurality of TCI states, and each TCI state includes a TCI state ID, a QCL type, and a reference RS-ID. The TCI state ID may be an index value. The terminal device may search the TCI state table for a corresponding reference RS-ID and QCL type by using the TCI state ID carried in the configuration information. In this embodiment, a QCL type corresponding to the TCI state ID in the TCI state table is a Type D and a corresponding reference RS-ID is the first identifier.

For example, referring to Table 5, for example, Table 5 is a schematic structural diagram of a TCI state table according to an embodiment of the present invention. The TCI state table includes three TCI states. It is assumed that the first identifier is an RS-ID #2, and the TCI state ID is 1. It is found in the following TCI state table that a QCL type corresponding to the TCI state is a Type A, and a reference RS-1D is the RS-1D #2.

TABLE 5

TCI state table

| TCI state ID | QCL Type | RS-ID |
|---|---|---|
| 0 | Type D | RS-ID #0 |
| 1 | Type A | RS-ID #2 |
| 2 | Type A | RS-ID #3 |

It should be noted that, before receiving the first beam, the terminal device reports the second beam, but a beam indication reference RS-ID in the configuration information is not the first identifier. In this case, when receiving the first beam, the terminal device considers that the second beam is not reported, and the terminal device may perform configuration based on a spatial reception parameter of a downlink synchronization signal in a current synchronization.

Optionally, before receiving, by the terminal device, configuration information from the network device, the method further includes:

receiving, by the terminal device, the second beam from the network device, where the identifier of the reference signal sent on the second beam is the first identifier; and associating, by the terminal device, the spatial reception parameter of the second beam with the first identifier, where the spatial reception parameter of the second beam is configured after the second beam is reported.

Specifically, the terminal device prestores or pre-configures configuration information, where the configuration information includes but is not limited to at least one of a TCI state table, a TCI state ID, an identifier (which is the first identifier in this case) of a to-be-measured beam, time-frequency configuration information, a measurement quantity, and a reporting configuration. The time-frequency configuration information is a configuration of a time-frequency resource of the reference signal, and the measurement quantity is a related parameter to be measured. The configuration information may be sent by using higher layer signaling, for example, may be sent by using RRC signaling or a MAC-CE message. There are two cases for the reporting configuration: reporting is required and reporting is not required. The terminal device measures the second beam based on an indication of the measurement quantity and sends a measurement result to the network device based on a reporting configuration indication. The terminal device configures the spatial reception parameter for the second beam after the reporting is completed. The terminal device associates the first identifier with the spatial reception parameter, and stores an association relationship between the first identifier and the spatial reception parameter. Then, the terminal device configures a receive beam based on the spatial reception parameter, and receives, on the receive beam, a downlink signal from the network device.

Optionally, the terminal device measures the second beam within a prestored or pre-configured time length. The time length may be carried in the configuration information or may be a fixed value.

The time length may be notified by the network device to the terminal device. For example, the terminal device is notified by using at least one of radio resource control RRC signaling, system information SI, remaining system information RMSI, a new radio system information block 1 NR SIB 1, MAC-CE signaling, downlink control information DCI, a physical broadcast channel PBCH, and a PDCCH. Alternatively, the time length may be a fixed value. A granularity of the time length includes but is not limited to at least one of a slot, a subframe, and an OFDM symbol.

It should be noted that, that the terminal device associates the current first identifier with the spatial reception configuration configured after the second beam is measured may be indicated in the following cases:

1. If the first identifier is used as a reference identifier of a beam indication TCI state:

when the TCI state is used for beam indication of a channel, the terminal device may assume that there is a spatial QCL relationship between one DMRS group of the channel and the antenna port of the second beam that is measured last time and that corresponds to the first identifier; or when the TCI state is used for beam indication of a reference signal, the terminal device may assume that there is a spatial QCL relationship between an antenna port of the reference signal and the antenna port of the second beam that is measured last time and that corresponds to the first identifier.

2. If the first identifier is used as a reference identifier of a beam indication TCI state:

when the TCI state is used for a channel, the terminal device needs to receive the channel by using the spatial reception parameter configured after the second beam corresponding to the first identifier is measured last time; and when the TCI state is used for a reference signal, the terminal device needs to receive the reference signal by using the spatial reception parameter configured after the second beam corresponding to the first identifier is measured last time.

Embodiment 2

A first identifier and a second identifier have a QCL relationship, to be specific, there is a spatial QCL relationship between an antenna port of a reference signal corresponding to the first identifier and an antenna port of a reference signal corresponding to the second identifier. Before receiving a first beam, the terminal device reports a second beam. It should be noted that reporting described in this embodiment includes a process of measuring a beam to obtain a measurement result, and then sending the measurement result to the network device. The terminal device may determine, based on configuration information, that the first identifier and the second identifier have a spatial QCL relationship, and then determine, based on a prestored association relationship, a spatial reception parameter associated with the second identifier. The terminal device configures, based on the spatial reception parameter, a receive beam corresponding to the first beam. An identifier of the reference signal sent on the first beam is the first identifier, and an identifier of the reference signal sent on the second beam is the second identifier.

It should be noted that the spatial reception parameter represents the configurations of the receive beam, for example, the configurations of the beam direction, the beam gain, the antenna weight, the antenna panel, the transmission reference point, and the like. The spatial reception parameter in this embodiment may also be referred to as a beam configuration parameter, a reception configuration, a spatial reception configuration, or another name, and this is not limited in this embodiment.

Optionally, before receiving, by the terminal device, the first beam from the network device, the method further includes:

receiving, by the terminal device, configuration information from the network device, where the configuration information includes at least one of a TCI state table and a TCI state ID that is of the first beam.

Specifically, the TCI state table may include a plurality of TCI states, and each TCI state includes a TCI state ID, a QCL type, and a reference RS-ID. The TCI state ID may be an index value. The terminal device may search the TCI state table for a corresponding reference RS-ID and QCL type by using the TCI state ID carried in the configuration information. In this embodiment, a QCL type corresponding to the TCI state ID in the TCI state table is a Type D, and a corresponding reference RS-ID is the second identifier.

For example, Table 6 is a schematic structural diagram of a TCI state table according to an embodiment of the present invention. The TCI state table includes three TCI states. It is assumed that the identifier of the reference signal corresponding to the first beam is an RS-ID #0, and a TCI state ID for beam indication is 2. It is found in the following TCI state table that a QCL type corresponding to the TCI state ID is a Type A. and a reference RS is an RS-ID #1.

TABLE 6

TCI state table

| TCI state ID | QCL Type | RS-ID |
|---|---|---|
| 0 | Type D | RS-ID #0 |
| 1 | Type A | RS-ID #2 |
| 2 | Type A | RS-ID #1 |

Optionally, before receiving, by the terminal device, configuration information from the network device, the method further includes:

receiving, by the terminal device, the second beam from the network device, where an identifier of a reference signal sent on the second beam is the second identifier; and associating, by the terminal device, the spatial reception parameter of the second beam with the second identifier, where the spatial reception parameter of the second beam is configured after the second beam is reported.

Specifically, the terminal device prestores or pre-configures configuration information, where the configuration information includes but is not limited to at least one of a TCI state table, a TCI state ID, an identifier (which is the first identifier in this case) of a to-be-measured beam, time-frequency configuration information, a measurement quantity, and a reporting configuration. The time-frequency configuration information is a configuration of a time-frequency resource of the reference signal, for example, a time domain position and a frequency domain position of the time-frequency resource. The measurement quantity is a related parameter to be measured. The configuration information may be sent by using higher layer signaling, for example, may be sent by using RRC signaling or a MAC-CE message. There are two cases for the reporting configuration: reporting is required and reporting is not required. The terminal device measures the second beam based on the measurement quantity and sends a measurement result to the network device based on a reporting configuration indication. The terminal device configures the spatial reception parameter for the second beam after the reporting is completed. The terminal device associates the first identifier with the spatial reception parameter and stores an association relationship between the first identifier and the spatial reception parameter. Then, the terminal device configures a receive beam based on the spatial reception parameter, and receives, on the receive beam, a downlink signal from the network device.

Optionally, the terminal device measures and reports the second beam within a prestored or pre-configured time length. The time length may be carried in the configuration information. The time length may be notified by the network device to the terminal device. For example, the terminal device is notified by using at least one of radio resource control RRC signaling, system information SI, remaining system information RMSI, a new radio system information block 1 NR SIB 1, MAC-CE signaling, downlink control information DCI, a physical broadcast channel PBCH, and a PDCCH. Alternatively, the time length may be a fixed value. A granularity of the time length includes but is not limited to at least one of a slot, a subframe, and an OFDM symbol.

Optionally, the first identifier is a reference RS-ID or the second identifier is a reference RS-1D.

For example, the first identifier is an RS-ID #0, and the second identifier is an RS-ID #1. The RS-ID #0 may be a reference RS-ID in an RS-ID #1 beam indication TCI state, or the RS-ID #1 is a reference RS-ID corresponding to an RS-ID #0 beam indication TCI state.

Optionally, a type of the reference signal corresponding to the first identifier is the same as a type of the reference signal corresponding to the second identifier.

For example, the reference signal corresponding to the first identifier is a CSI-RS, and the reference signal corresponding to the second identifier is also a CSI-RS. For another example, the reference signal corresponding to the first identifier is an SSB, and the reference signal corresponding to the second identifier is also an SSB.

Optionally, the reference signal corresponding to the first identifier or the reference signal corresponding to the second identifier is an aperiodic signal.

It should be noted that, in Embodiment 1 and Embodiment 2, the first beam and the second beam may be a same beam, that is, spatial transmit parameters (including configurations of at least one of a beam direction, a beam gain, an antenna weight, and the like) of the first beam and the second beam are the same. Alternatively, the first beam and the second beam may be different beams, that is, spatial transmit parameters of the two beams are different.

It should be noted that, in Embodiment 1 and Embodiment 2, a possible value of the prestored or pre-configured time length includes at least one of the following:

(a) a time period in which current or latest $k^{th}$ RRC signaling is effective;

(b) a time period in which a current or latest $k^{th}$ MAC-CE message is effective;

(c) a time period before k time units, where the time unit may be an OFDM symbol, a subframe, a time of a frame, a millisecond unit, or the like;

(d) a time period before latest $k^{th}$ RRC signaling being effective; and (e) a time period before a latest $k^{th}$ MAC-CE message being effective.

It should be noted that, according to the foregoing embodiments, the terminal device configures, based on the spatial reception parameter configured after the second beam is reported in the preset time length, the receive beam corresponding to the first beam.

The foregoing embodiments are implemented, so that the terminal device configures an appropriate spatial reception parameter for the receive beam based on the spatial reception parameter that is configured after the terminal device reports a transmit beam having the same identifier last time, thereby reducing a time for pairing the receive beam and the transmit beam, and reducing a data transmission delay.

Figure 4:
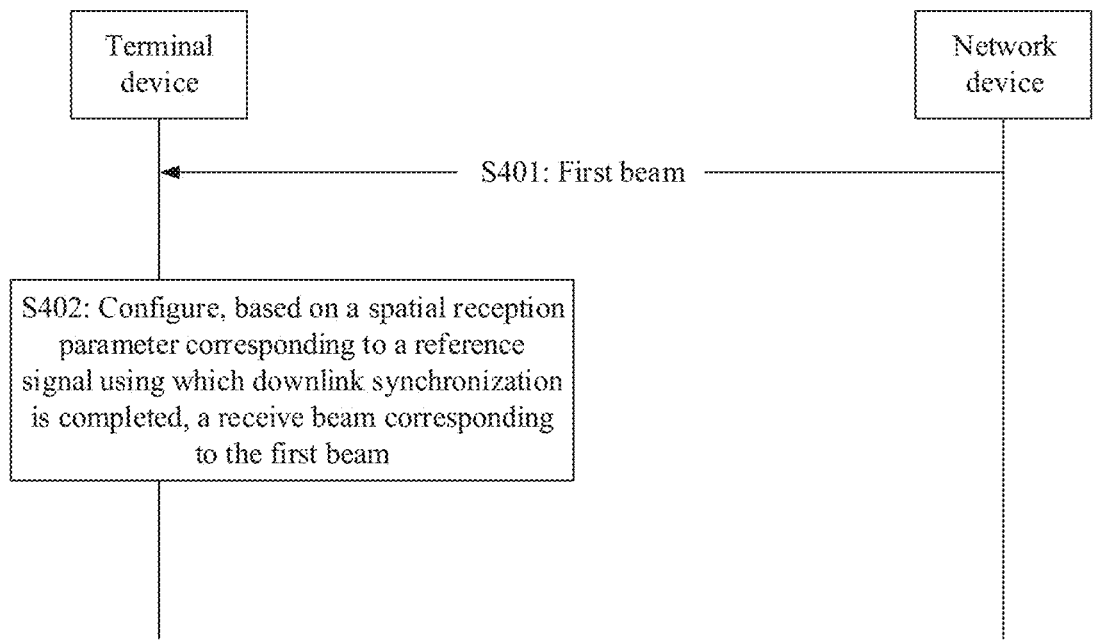
FIG. 4 is another schematic flowchart of a beam configuration method according to an embodiment of the present invention.

FIG. 4 is a schematic flowchart of another beam configuration method according to an embodiment of the present invention. In this embodiment of the present invention, the method includes the following steps.

S401: A network device sends a first beam to a terminal device, and the terminal device receives the first beam from the network device.

Specifically, an identifier of a reference signal sent on the first beam is a first identifier, and the first identifier may be an RS-ID, for example, any one of an SSB ID, a CSI-RS ID, a TRS ID, a resource setting ID, and a resource set ID. A channel of the reference signal sent on the first beam may be a control channel, a traffic channel, or a broadcast channel. For example, the control channel includes a PDCCH, the traffic channel includes a physical downlink shared channel (PDSCH), and the broadcast channel includes a PBCH. Correspondingly, the reference signal sent on the first beam includes but is not limited to an SSS, a PSS, a PDCCH-DMRS, a PDSCH-DMRS, a PTRS, a CRS, a CSI-RS, and a TRS. A spatial reception parameter is used to indicate related configurations of a beam, including configurations of a main lobe direction, a beam gain, an antenna weight, an antenna panel, a transmission reference point, and the like.

S402: The terminal device configures, based on a spatial reception parameter corresponding to a reference signal using which downlink synchronization is completed, a receive beam corresponding to the first beam.

Embodiment 1

Before the terminal device receives the first beam, if the terminal device does not measure a second beam corresponding to the first identifier, the terminal device configures, based on a spatial reception parameter corresponding to a reference signal using which downlink synchronization is completed, a receive beam corresponding to the first beam. The reference signal using which downlink synchronization is completed is a reference signal using which downlink synchronization is completed after the terminal device accesses a cell. For example, the reference signal using which downlink synchronization is completed is an SSB. The terminal device stores a spatial reception parameter of the receive beam corresponding to the SSB. Before the terminal device receives the first beam, if the terminal device does not measure the second beam corresponding to the first identifier, the terminal device configures the receive beam corresponding to the first beam based on the spatial reception parameter corresponding to the SSB.

Optionally, before the terminal device receives the first beam, if the terminal device does not measure the second beam corresponding to the first identifier in a prestored or pre-configured time length, the terminal device configures, based on the spatial reception parameter of the reference signal using which downlink synchronization is completed, the receive beam corresponding to the first beam. The time length may be notified by the network device to the terminal device. For example, the terminal device is notified by using at least one of radio resource control RRC signaling, system information SI, remaining system information RMSI, a new radio system information block 1 NR SIB 1, MAC-CE signaling, downlink control information DCI, a physical broadcast channel PBCH, and a PDCCH. Alternatively, the time length may be a fixed value. A granularity of the time length includes but is not limited to at least one of a slot, a subframe, and an OFDM symbol.

This embodiment of the present invention is implemented, so that before the terminal device receives a beam, if the terminal device does not measure the second beam, the terminal device configures a receive beam based on the spatial reception parameter of the reference signal using which current synchronization is completed, thereby reducing a time for pairing a transmit beam and the receive beam, and reducing a data transmission delay.

Embodiment 2

Before the terminal device receives a first beam, if the terminal device does not report a second beam corresponding to a first identifier, the terminal device configures, based on a spatial reception parameter corresponding to a reference signal using which downlink synchronization is completed, a receive beam corresponding to the first beam. The reference signal using which downlink synchronization is completed is a reference signal using which downlink synchronization is completed after the terminal device accesses a cell, for example, an SSB. After completing downlink synchronization, the terminal device stores a spatial reception that corresponds to the SSB. Before the terminal device receives the first beam, if the terminal device does not report the second beam corresponding to the first identifier, the terminal device configures the receive beam corresponding to the first beam based on the spatial reception parameter corresponding to the SSB. It should be noted that reporting described in this embodiment includes a process of measuring a beam and then sending a measurement result to the network device.

Optionally, before the terminal device receives the first beam, if the terminal device does not measure or report the second beam corresponding to the first identifier in a pre-stored or pre-configured time length, the terminal device configures, based on the spatial reception parameter of the reference signal using which downlink synchronization is completed, the receive beam corresponding to the first beam. The time length may be notified by the network device to the terminal device. For example, the terminal device is notified by using at least one of radio resource control RRC signaling, system information SI, remaining system information RMSI, a new radio system information block 1 NR SIB 1, MAC-CE signaling, downlink control information DCI, a physical broadcast channel PBCH, and a PDCCH. Alternatively, the time length may be a fixed value. A granularity of the time length includes but is not limited to at least one of a slot, a subframe, and an OFDM symbol.

This embodiment of the present invention is implemented, so that before the terminal device receives a beam, if the terminal device does not report the second beam, the terminal device configures the receive beam based on the spatial reception parameter of the reference signal using which current synchronization is completed, thereby reducing a time for pairing a transmit beam and the receive beam, and reducing a data transmission delay.

Embodiment 3

A first identifier and a second identifier have a QCL relationship, to be specific, there is a spatial QCL relationship between an antenna port of a reference signal corresponding to the first identifier and an antenna port of a reference signal corresponding to the second identifier.

Before the terminal device receives a first beam, if the terminal device does not measure a second beam corresponding to the first identifier and does not measure a third beam corresponding to the second identifier, the terminal device configures, based on a spatial reception parameter corresponding to a reference signal using which downlink synchronization is completed, a receive beam corresponding to the first beam. The reference signal using which downlink synchronization is completed is a reference signal using which downlink synchronization is completed after the terminal device accesses a cell. For example, the reference signal using which downlink synchronization is completed is an SSB.

Optionally, before the terminal device receives the first beam, if the terminal device does not measure the second beam corresponding to the first identifier in a prestored or pre-configured time length, and does not measure a third beam corresponding to the second identifier in the time length, the terminal device configures, based on the spatial reception parameter of the reference signal using which downlink synchronization is completed, the receive beam corresponding to the first beam. The time length may be carried in configuration information, or may be a fixed value, and this is not limited in this embodiment. The configuration information may be sent by using higher layer signaling.

Optionally, before receiving, by the terminal device, the first beam from the network device, the method further includes:

receiving, by the terminal device, configuration information from the network device, where the configuration information includes a TCI state table and a TCI state ID that is of the first beam and that indicates a beam indication.

Specifically, the TCI state table may include a plurality of TCI states, and the TCI state ID may be an index value. The TCI state table is searched for a corresponding TCI state by using the index value, to determine a reference identifier corresponding to the TCI state.

For example, Table 4 above is a schematic structural diagram of a TCI state table according to an embodiment of the present invention. The TCI state table includes three TCI states. It is assumed that the TCI state ID is 2. It is found in the following TCI state table that a QCL type corresponding to the TCI state is a Type A, and a reference RS-ID is an RS-ID #1.

Optionally, before receiving, by the terminal device, configuration information from the network device, the method further includes:

receiving, by the terminal device, the second beam from the network device, where an identifier of a reference signal sent on the second beam is the second identifier; and associating, by the terminal device, the spatial reception parameter of the second beam with the second identifier, where the spatial reception parameter of the second beam is configured after the second beam is measured and reported.

Specifically, the terminal device prestores or pre-configures configuration information, where the configuration information includes but is not limited to a TCI state table, a TCI state ID, an identifier (which is the first identifier in this case) of a to-be-measured beam, time-frequency configuration information, a measurement quantity, and a reporting configuration. The time-frequency configuration information is a configuration of a time-frequency resource of the reference signal, for example, a time domain position and a frequency domain position of the time-frequency resource. The measurement quantity is a related parameter to be measured. The configuration information may be sent by using higher layer signaling, for example, may be sent by using RRC signaling or a MAC-CE message. There are two cases for the reporting configuration: reporting is required and reporting is not required. The terminal device measures the second beam based on the measurement quantity and sends a measurement result to the network device based on a reporting configuration indication. The terminal device configures the spatial reception parameter for the second beam after the reporting is completed. The terminal device associates the first identifier with the spatial reception parameter and stores an association relationship between the first identifier and the spatial reception parameter.

Optionally, the terminal device measures and reports the second beam within a prestored or pre-configured time length. The time length may be carried in the configuration information. The time length may be notified by the network device to the terminal device. For example, the terminal device is notified by using at least one of radio resource control RRC signaling, system information SI, remaining system information RMSI, a new radio system information block 1 NR SIB 1, MAC-CE signaling, downlink control information DCI, a physical broadcast channel PBCH, and a PDCCH. Alternatively, the time length may be a fixed value. A granularity of the time length includes but is not limited to at least one of a slot, a subframe, and an OFDM symbol.

Optionally, the first identifier is a reference RS-ID or the second identifier is a reference RS-ID.

For example, the first identifier is an RS-ID #0, and the second identifier is an RS-ID #1. The RS-ID #0 may be a reference RS-ID in an RS-ID #1 beam indication TCI state, or the RS-ID #1 is a reference RS-ID corresponding to an RS-ID #0 beam indication TCI state.

Optionally, a type of the reference signal corresponding to the first identifier is the same as a type of the reference signal corresponding to the second identifier.

For example, the reference signal corresponding to the first identifier is a CSI-RS, and the reference signal corresponding to the second identifier is also a CSI-RS. For another example, the reference signal corresponding to the first identifier is an SSB, and the reference signal corresponding to the second identifier is also an SSB.

Optionally, the reference signal corresponding to the first identifier or the reference signal corresponding to the second identifier is an aperiodic signal.

This embodiment of the present invention is implemented, so that before the terminal device receives a transmit beam, if the terminal device does not measure the second beam, and also does not measure a beam having a spatial QCL relationship with the transmit beam, the terminal device configures the receive beam based on the spatial reception parameter of the reference signal using which current synchronization is completed, thereby reducing a time for pairing the transmit beam and the receive beam, and reducing a data transmission delay.

Embodiment 4

The first identifier and the second identifier have a QCL relationship, to be specific, there is a spatial QCL relationship between an antenna port of a reference signal corresponding to the first identifier and an antenna port of a reference signal corresponding to the second identifier. Before the terminal device receives the first beam, if the terminal device does not measure or report a second beam corresponding to the first identifier and does not measure or report a third beam corresponding to the second identifier, the terminal device configures, based on a spatial reception parameter corresponding to a reference signal using which downlink synchronization is completed, a receive beam corresponding to the first beam. The reference signal using which downlink synchronization is completed is a reference signal using which downlink synchronization is completed after the terminal device accesses a cell. For example, the reference signal using which downlink synchronization is completed is an SSB.

Optionally, before the terminal device receives the first beam, if the terminal device does not measure or report the second beam corresponding to the first identifier in a prestored or pre-configured time length, and does not measure or report a third beam corresponding to the second identifier in the time length, the terminal device configures, based on the spatial reception parameter of the reference signal using which downlink synchronization is completed, the receive beam corresponding to the first beam. The time length may be carried in the configuration information and configuration information that is of the third beam and is notified by the network device to the terminal device. A notification manner may be higher layer signaling or another manner. The time length may alternatively be a fixed value, and this is not limited in this embodiment.

Optionally, before receiving, by the terminal device, the first beam from the network device, the method further includes:

receiving, by the terminal device, configuration information from the network device, where the configuration information includes at least one of a TCI state table and a TCI state ID that is of the first beam.

Specifically, the TCI state table may include a plurality of TCI states, and each TCI state includes a TCI state ID, a QCL type, and a reference RS-ID. The TCI state ID may be an index value. The terminal device may search the TCI state table for a corresponding reference RS-ID and QCL type by using the TCI state ID carried in the configuration information.

Optionally, before receiving, by the terminal device, configuration information from the network device, the method further includes:

receiving, by the terminal device, the second beam from the network device, where an identifier of a reference signal sent on the second beam is the second identifier; and associating, by the terminal device, the spatial reception parameter of the second beam with the second identifier, where the spatial reception parameter of the second beam is configured after the second beam is reported.

Specifically, the terminal device prestores or pre-configures configuration information, where the configuration information includes but is not limited to a TCI state table, a TCI state ID, an identifier (which is the first identifier in this case) of a to-be-measured beam, time-frequency configuration information, a measurement quantity, and a reporting configuration. The time-frequency configuration information is a configuration of a time-frequency resource of the reference signal, for example, a time domain position and a frequency domain position of the time-frequency resource. The measurement quantity is a related parameter to be measured. The configuration information may be sent by using higher layer signaling, for example, may be sent by using RRC signaling or a MAC-CE message. There are two cases for the reporting configuration: reporting is required and reporting is not required. The terminal device measures the second beam based on the measurement quantity and sends a measurement result to the network device based on a reporting configuration indication. The terminal device configures the spatial reception parameter for the second beam after the reporting is completed. The terminal device associates the first identifier with the spatial reception parameter and stores an association relationship between the first identifier and the spatial reception parameter.

Optionally, the terminal device measures and reports the second beam within a prestored or pre-configured time length. The time length may be carried in the configuration information. The time length may be notified by the network device to the terminal device. For example, the terminal device is notified by using at least one of radio resource control RRC signaling, system information SI, remaining system information RMSI, a new radio system information block 1 NR SIB 1, MAC-CE signaling, downlink control information DCI, a physical broadcast channel PBCH, and a PDCCH. Alternatively, the time length may be a fixed value. A granularity of the time length includes but is not limited to at least one of a slot, a subframe, and an OFDM symbol.

Optionally, the first identifier is a reference RS-ID or the second identifier is a reference RS-ID.

For example, the first identifier is an RS-ID #0, and the second identifier is an RS-ID #1. The RS-ID #0 may be a reference RS-ID in an RS-ID #1 beam indication TCI state, or the RS-ID #1 is a reference RS-D corresponding to an RS-D #0 beam indication TCI state.

Optionally, a type of the reference signal corresponding to the first identifier is the same as a type of the reference signal corresponding to the second identifier.

For example, the reference signal corresponding to the first identifier is a CSI-RS, and the reference signal corresponding to the second identifier is also a CSI-RS. For another example, the reference signal corresponding to the first identifier is an SSB, and the reference signal corresponding to the second identifier is also an SSB.

Optionally, the reference signal corresponding to the first identifier or the reference signal corresponding to the second identifier is an aperiodic signal.

It should be noted that, in Embodiment 1 and Embodiment 2, the first beam and the second beam may be a same beam, that is, spatial transmit parameters (including configurations of at least one of a beam direction, a beam gain, an antenna weight, and the like) of the first beam and the second beam are the same. Alternatively, the first beam and the second beam may be different beams, that is, spatial transmit parameters of the two beams are different.

It should be noted that in Embodiment 1 to Embodiment 4, a possible value of the prestored or pre-configured time length includes at least one of the following:

(a) a time period in which current or latest $k^{th}$ RRC signaling is effective;

(b) a time period in which a current or latest $k^{th}$ MAC-CE message is effective;

(c) a time period before k time units, where the time unit may be an OFDM symbol, a subframe, a time of a frame, a millisecond unit, or the like;

(d) a time period before latest $k^{th}$ RRC signaling being effective; and (e) a time period before a latest $k^{th}$ MAC-CE message being effective.

This embodiment of the present invention is implemented, so that before a transmit beam is received, if the second beam is not measured and reported, and a beam having a spatial QCL relationship with the transmit beam is also not measured and reported, a receive beam is configured based on the spatial reception parameter of the reference signal using which current synchronization is completed.

Therefore, a time for pairing the transmit beam and the receive beam is reduced, and a data transmission delay is reduced.

FIG. 2 to FIG. 4 describe in detail beam configuration methods according to the embodiments of the present invention. The following provides a beam configuration apparatus (referred to as an apparatus 5) according to an embodiment of the present invention. The apparatus 5 includes a receiving unit 501 and a processing unit 502.

Figure 5:
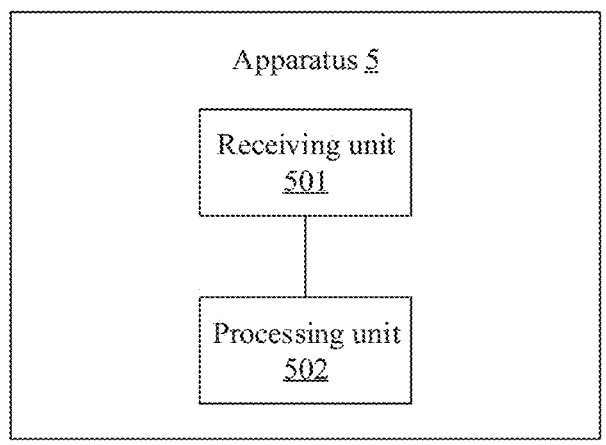
FIG. 5 is a schematic structural diagram of a beam configuration apparatus according to an embodiment of the present invention.

In a possible implementation, the apparatus 5 shown in FIG. 5 may implement the terminal device side in the embodiments shown in FIG. 2 to FIG. 4.

The receiving unit 501 is configured to receive a first beam from a network device, where an identifier of a reference signal sent on the first beam is a first identifier.

The processing unit 502 is configured to configure, based on a spatial reception parameter configured after a second beam corresponding to the first identifier is measured or reported last time, a receive beam corresponding to the first beam.

Optionally, the receiving unit 501 is further configured to receive configuration information from the network device, where the configuration information includes at least one of a transmission configuration indicator (TCI) state table and a TCI state identifier (ID) that is of the first beam, and an identifier corresponding to the TCI state ID in the TCI state table is the first identifier.

Optionally, the receiving unit 501 is further configured to receive the second beam from the network device, where an identifier of a reference signal sent on the second beam is the first identifier.

The processing unit 502 is further configured to associate the spatial reception parameter of the second beam with the first identifier, where the spatial reception parameter of the second beam is configured after the second beam is measured or reported.

Optionally, the second beam is measured or reported within a prestored or pre-configured time length.

In another possible implementation,
the receiving unit 501 is configured to receive a first beam from a network device, where an identifier of a reference signal sent on the first beam is a first identifier; and the processing unit 502 is configured to configure, based on a spatial reception parameter configured after a second beam corresponding to a second identifier is measured or reported last time, a receive beam corresponding to the first beam, where the first identifier and the second identifier have a spatial quasi co-location spatial QCL relationship.

Optionally, the receiving unit 501 is further configured to receive configuration information from the network device, where the configuration information includes at least one of a TCI state table and a TCI state ID that is of the first beam, and an identifier corresponding to the TCI state ID in the TCI state table is the second identifier.

Optionally, the receiving unit 501 is further configured to receive the second beam from the network device, where an identifier of a reference signal sent on the second beam is the second identifier.

The processing unit 502 is further configured to associate the spatial reception parameter of the second beam with the second identifier, where the spatial reception parameter of the second beam is configured after the second beam is measured or reported.

Optionally, the second beam is measured or reported within a prestored or pre-configured time length.

Optionally, the first identifier is a reference RS-ID or the second identifier is a reference RS-ID.

Optionally, a type of the reference signal sent on the first beam is the same as a type of the reference signal sent on the second beam.

Optionally, the reference signal sent on the first beam or the reference signal sent on the second beam is an aperiodic signal.

In another possible implementation,
the receiving unit 501 is configured to receive a first beam from a network device, where an identifier of a reference signal sent on the first beam is a first identifier; and the processing unit 502 is configured to configure a receive beam corresponding to the first beam based on a spatial reception parameter corresponding to a downlink synchronization signal in current synchronization, where before the first beam is received, the second beam corresponding to the first identifier is not measured, an identifier of a reference signal sent on the second beam is the first identifier, and there is a spatial QCL relationship between an antenna port of the reference signal sent on the first beam and an antenna port of the reference signal sent on the second beam.

Optionally, the second beam corresponding to the first identifier is not measured within a prestored or pre-configured time length.

In another possible implementation,
the receiving unit 501 is configured to receive a first beam from a network device, where an identifier of a reference signal sent on the first beam is a first identifier; and the processing unit 502 is configured to configure a receive beam corresponding to the first beam based on a spatial reception parameter corresponding to a downlink synchronization signal in current synchronization, where before the first beam is received, the second beam corresponding to the first identifier is not reported, and there is a spatial QCL relationship between an antenna port of the reference signal sent on the first beam and an antenna port of a reference signal sent on the second beam.

Optionally, the second beam corresponding to the first identifier is not reported within a prestored or pre-configured time length.

In another possible implementation,
the receiving unit 501 is configured to receive a first beam from a network device, where an identifier of a reference signal sent on the first beam is a first identifier; and the processing unit 502 is configured to configure a receive beam corresponding to the first beam based on a spatial reception parameter corresponding to a downlink synchronization signal in current synchronization, where the first identifier and the second identifier have a spatial QCL relationship, before the first beam is received, the second beam corresponding to the first identifier is not measured, and a third beam corresponding to the second identifier is not measured, and there is a spatial QCL relationship between an antenna port of the reference signal sent on the first beam, an antenna port of a reference signal sent on the second beam, and an antenna port of a reference signal sent on the third beam.

Optionally, the second beam corresponding to the first identifier is not measured within a prestored or pre-configured time length, and the third beam corresponding to the second identifier is also not measured within the time length.

Optionally, the receiving unit 501 is further configured to receive configuration information from the network device, where the configuration information includes a TCI state table and a TCI state ID that is of the first beam. The TCI state ID corresponds to the second identifier in the TCI state table, to be specific, the second identifier is used as a reference RS-ID and the first identifier and the second identifier have a spatial QCL relationship.

In another possible implementation, the receiving unit 501 is configured to receive a first beam from a network device, where an identifier of a reference signal sent on the first beam is a first identifier; and the processing unit 502 is configured to configure a receive beam corresponding to the first beam based on a spatial reception parameter corresponding to a downlink synchronization signal in current synchronization, where the first identifier and the second identifier have a spatial QCL relationship before the first beam is received, the second beam corresponding to the first identifier is not reported, and a third beam corresponding to the second identifier is not reported, and there is a spatial QCL relationship between an antenna port of the reference signal sent on the first beam, an antenna port of a reference signal sent on the second beam, and an antenna port of a reference signal sent on the third beam.

Optionally, the second beam corresponding to the first identifier is not reported within a prestored or pre-configured time length, and the third beam corresponding to the second identifier is also not reported within the time length.

Optionally, the receiving unit is further configured to receive configuration information from the network device, where the configuration information includes a TCI state table and a TCI state ID. The TCI state ID corresponds to the second identifier in the TCI state table, to be specific, the first identifier and the second identifier have a spatial QCL relationship and the second identifier is a reference RS-1D.

The apparatus 5 may be a terminal device, or the apparatus 5 may be a field programmable gate array (FPGA), a dedicated integrated chip, a system on chip (SoC), a central processing unit (CPU), a network processor (NP), a digital signal processing circuit, or a micro controller unit (MCU) that implements a related function, or may be a programmable logic device (PLD) or another integrated chip.

This embodiment of the present invention and the method embodiments in FIG. 2 to FIG. 4 are based on a same concept, the technical effects brought by the embodiments are also the same. For a specific process, refer to descriptions in the method embodiments in FIG. 2 to FIG. 4. Details are not described herein again.

Figure 6:
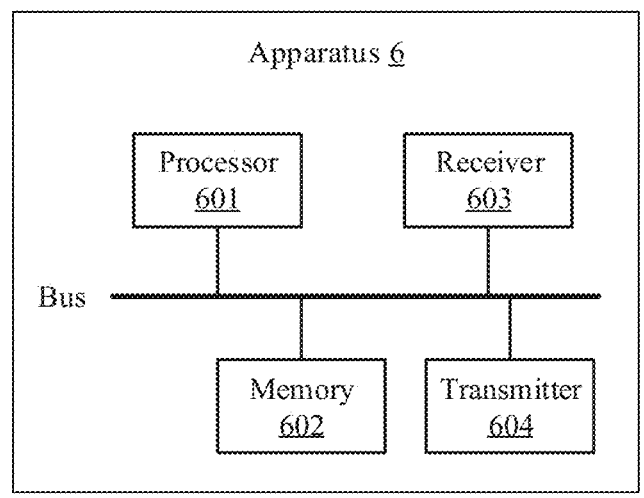
FIG. 6 is another schematic structural diagram of a beam configuration apparatus according to an embodiment of the present invention.

FIG. 6 is a schematic structural diagram of an apparatus according to an embodiment of the present invention. The apparatus is referred to as an apparatus 6 below. The apparatus 6 may be integrated into the foregoing network device or terminal device. As shown in FIG. 6, the apparatus includes a memory 602, a processor 601, a transmitter 604, and a receiver 603.

The memory 602 may be an independent physical unit and may be connected to the processor 601, the transmitter 604, and the receiver 603 by using a bus. Alternatively, the memory 602, the processor 601, the transmitter 604, and the receiver 601 may be integrated together and implemented by hardware, or the like.

The transmitter 604 and the receiver 603 may be further connected to antennas. The receiver 603 receives, by using an antenna, information transmitted by another device. Correspondingly, the transmitter 604 transmits information to another device by using an antenna.

The memory 602 is configured to store a program for implementing the foregoing method embodiments or each module in the apparatus embodiments, and the processor 601 invokes the program to perform operations of the foregoing method embodiments.

Optionally, some or all of the beam configuration methods in the foregoing embodiments are implemented by using software, a beam configuration apparatus may alternatively include only a processor. The memory configured to store the program is located outside the apparatus. The processor is connected to the memory by using a circuit/wire and is configured to read and execute the program stored in the memory.

The processor may be a central processing unit (CPU), a network processor (NP), or a combination of a CPU and an NP.

The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory may include a volatile memory, for example, a random access memory (RAM); or the memory may include a non-volatile memory, for example, a flash memory, a hard disk drive (HDD), or a solid-state drive (SSD); or the memory may include a combination of the foregoing types of memories.

In the foregoing embodiments, the sending module or the transmitter performs the steps of sending in the foregoing method embodiments, the receiving module or the receiver performs the steps of reception in the foregoing method embodiments, and other steps are performed by another module or the processor. The sending module and the receiving module may constitute a transceiver module, and the receiver and the transmitter may constitute a transceiver.

An embodiment of this application further provides a computer storage medium, storing a computer program, and the computer program is configured to perform the beam configuration methods provided in the foregoing embodiments.

An embodiment of this application further provides a computer program product including an instruction. When the computer program product runs on a computer, the computer is enabled to perform the beam configuration method in the foregoing embodiments.

A person skilled in the art should understand that the embodiments of this application may be provided as a method, a system, or a computer program product. Therefore, this application may use a form of hardware only embodiments, software only embodiments, or embodiments in combination with software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

What is claimed is:

1. A beam configuration method, comprising:
   determining, by a terminal device, a receive beam for receiving a signal transmitted on a transmit beam of a network device; and
   receiving, by the terminal device, the signal through the receive beam, wherein when the transmit beam has not been measured or reported by the terminal device within a preset or pre-configured time length before the signal is received by the terminal device, the receive beam is determined based on a spatial reception parameter corresponding to a synchronization signal, and wherein the synchronization signal satisfies a quasi co-location (QCL) relationship with a reference signal associated with the transmit beam.

2. The method according to claim 1, further comprising:
   receiving, by the terminal device, configuration information from the network device, wherein the configuration information comprises a transmission configuration indicator (TCI) state associated with the transmit beam, and wherein the TCI state includes an identifier of the reference signal.

3. A beam configuration apparatus, comprising:
   at least one processor, the at least one processor configured to determine a receive beam for receiving a signal transmitted on a transmit beam of a network device; and
   a receiver, the receiver configured to receive the signal through the receive beam, wherein when the transmit beam has not been measured or reported by the beam configuration apparatus within a preset or pre-configured time length before the signal is received by the beam configuration apparatus, the receive beam is determined based on a spatial reception parameter corresponding to a synchronization signal, and wherein the synchronization signal satisfies a quasi co-location (QCL) relationship with a reference signal associated with the transmit beam.

4. The apparatus according to claim 3, wherein the receiver is further configured to receive configuration information from the network device, wherein the configuration information comprises a transmission configuration indicator (TCI) state associated with the transmit beam, and wherein the TCI state includes an identifier of the reference signal.

5. A non-transitory computer-readable storage medium comprising instructions which, when executed by one or more processors, cause the one or more processors to perform operations comprising:
   determining, by a terminal device, a receive beam for receiving a signal transmitted on a transmit beam of a network device; and
   receiving, by the terminal device, the signal through the receive beam, wherein when the transmit beam has not been measured or reported by the terminal device within a preset or pre-configured time length before the signal is received by the terminal device, the receive beam is determined based on a spatial reception parameter corresponding to a synchronization signal, and wherein the synchronization signal satisfies a quasi co-location (QCL) relationship with a reference signal associated with the transmit beam.

6. The non-transitory computer-readable storage medium according to claim 5, the operations further comprising:
   receiving configuration information from the network device, wherein the configuration information comprises a transmission configuration indicator (TCI) state associated with the transmit beam, and wherein the TCI state includes an identifier of the reference signal.

* * * * *